(12) United States Patent
Allen, Jr. et al.

(10) Patent No.: US 11,012,001 B2
(45) Date of Patent: May 18, 2021

(54) TRANSFORMER-LESS, TAPPED POINT AC VOLTAGE SPLITTER FOR FULL BRIDGE DC AC INVERTERS

(71) Applicants: James A. Allen, Jr., Gilroy, CA (US); William B. Reed, San Jose, CA (US); Eugene F. Krzywinski, San Jose, CA (US)

(72) Inventors: James A. Allen, Jr., Gilroy, CA (US); William B. Reed, San Jose, CA (US); Eugene F. Krzywinski, San Jose, CA (US)

(*) Notice: Subject to any disclaimer, the term of this patent is extended or adjusted under 35 U.S.C. 154(b) by 0 days.

(21) Appl. No.: 16/751,698

(22) Filed: Jan. 24, 2020

(65) Prior Publication Data

US 2020/0186055 A1 Jun. 11, 2020

Related U.S. Application Data

(63) Continuation-in-part of application No. 16/367,247, filed on Mar. 28, 2019, now abandoned.

(60) Provisional application No. 62/649,198, filed on Mar. 28, 2018.

(51) Int. Cl.
*H02M 7/5387* (2007.01)
*H02M 7/487* (2007.01)

(52) U.S. Cl.
CPC ......... *H02M 7/5387* (2013.01); *H02M 7/487* (2013.01)

(58) Field of Classification Search
CPC .. H02M 7/487; H02M 7/537; H02M 7/53871; H02M 7/5387; H02J 3/381; H02J 2300/24; H02J 3/383; H02J 2300/26; Y02E 10/563; Y02E 10/56; H02S 40/32
See application file for complete search history.

(56) References Cited

U.S. PATENT DOCUMENTS

| | | | |
|---|---|---|---|
| 9,515,577 B2 | 12/2016 | Kidera et al. | |
| 9,812,986 B2 * | 11/2017 | Hong | H02M 1/32 |
| 10,505,469 B2 | 12/2019 | Li et al. | |
| 10,700,591 B2 * | 6/2020 | Rasek | H02M 7/483 |

* cited by examiner

*Primary Examiner* — Ryan Johnson
(74) *Attorney, Agent, or Firm* — Michael B. Einschlag

(57) ABSTRACT

A DC AC inverter system includes a full bridge DC AC inverter, a first module with a first capacitance connected to a positive DC input and an intermediate output, and a second module with a second capacitance connected to a negative DC input and to the intermediate output, wherein the first and second capacitance is greater than $P\Delta\Delta/(V\Delta*V_{nom}*2\pi f)$; (a) $P\Delta$ is a predetermined power imbalance between a first output and the intermediate output and a second output and the intermediate output; (b) $V_{nom}$ is a predetermined nominal output voltage between the first output and the intermediate output (V1) and the second output and the intermediate output (V2); (c) $V\Delta$ is a predetermined fraction of voltage difference, relative to $V_{nom}$, between V1 and V2 when there is a power imbalance $P\Delta$; and (d) f is a frequency of V1 or V2.

11 Claims, 4 Drawing Sheets

TRANSFORMER-LESS, TAPPED POINT AC VOLTAGE SPLITTER FOR FULL BRIDGE DC AC INVERTERS

This patent application is a continuation-in-part of a U.S. patent application entitled "Transformer-less Tapped Point AC Voltage Splitter for Full Bridge DC AC Inverters" having application Ser. No. 16/367,247 which was filed on Mar. 28, 2019, which U.S. patent application claimed priority under 35 U.S.C. 119(e) from a U.S. provisional patent application having Appl. No. 62/649,198 which was filed on Mar. 28, 2018, all of which prior patent applications are incorporated herein by reference in their entireties.

One or more embodiments relate to transformer-less, AC voltage splitters for full bridge DC AC inverters.

BACKGROUND

Conversion of DC to AC is an important part of utilizing renewable energy for consumption in virtually all industrialized countries, as well as in many emerging countries and societies. In the U.S., a national grid provides a network of power that is capable of multiple voltages and phases. In this regard, the national grid can be considered as both an infinite source and an infinite sink and is, therefore, a reliable reference point for all things electrical. For example, in solar installations, energy is harvested in DC and converted to AC that is synchronized to the grid for grid-tied applications. Off-grid applications though, have no grid to which they can be synchronized and, therefore, a reference is usually to earth.

In the U.S., in order to keep transmission and distribution costs low, the grid supply to residences and small business is typically single phase. However, many appliances, such as ovens, air conditioners, electric dryers and emerging charging stations for electric vehicles (EVs) benefit from a voltage that is much higher than that used by standard household appliances. As such, an electrical distribution panel typically supplies both $240V_{AC}$ and $120V_{AC}$. However, to keep distribution infrastructure costs low, the utility typically supplies $240V_{AC}$. This $240V_{AC}$ is comprised of three wires from one of the phases of a three phase network, where the three wires are designated as L1 and L2 and N. This configuration provides $240V_{AC}$ when wires L1 and L2 are referenced to each other and $120V_{AC}$ when wire L1 or wire L2 is referenced to a neutral point (wire N), or to earth. The two $120V_{AC}$ supplies are 180° out of phase with each other because of a transformer winding polarity typically used by the utility.

Grid-tied inverters, especially those having a power rating over 1 kW, transfer power at $240V_{AC}$ (or local utility voltage) and do not need to split that output into two $120V_{AC}$ lines. However, off-grid inverters typically must supply both $240V_{AC}$ and $120V_{AC}$ voltages. Usually, this is done using a scaled down version of a utility transformer which splits the voltage into two out of phase AC voltages (a split phase transformer). These split phase transformers are costly and heavy, with cost and weight typically increasing with power rating. As more renewable, predominantly DC, energy sources are installed, dependence on the utility grid decreases. However, in some cases, the utility grid may not be available. In addition, the power requirement for a typical off-grid inverter may be several times larger than that needed for a grid-tied inverter for the same dwelling size, and as a result, a transformer required to provide single and split phase output may weigh on the order of several hundred pounds. Typically, such transformers are bulky; taking up considerable space for themselves and the area clearance needed for thermal dissipation. Such transformers are typically comprised of heavy iron cores and large gauge copper windings. Further, they consume power, even at no-load conditions. Because a typical split phase transformer has both primary and secondary coils, with a magnetic path to couple the two coils, the transformer will have continuous power loss at both the $240V_{AC}$ as well as the $120V_{AC}$ output voltage levels.

Several approaches have been tried to deal with the above-described issues using solid state implementations. However, these are complex, costly, and still require the use of a phase splitting transformer, although of a smaller size.

SUMMARY

One or more embodiments provide a small form factor, lower cost, capacitor-based alternative to bulky, iron core (inductive based) transformers.

DETAILED DESCRIPTION

Figure 1:
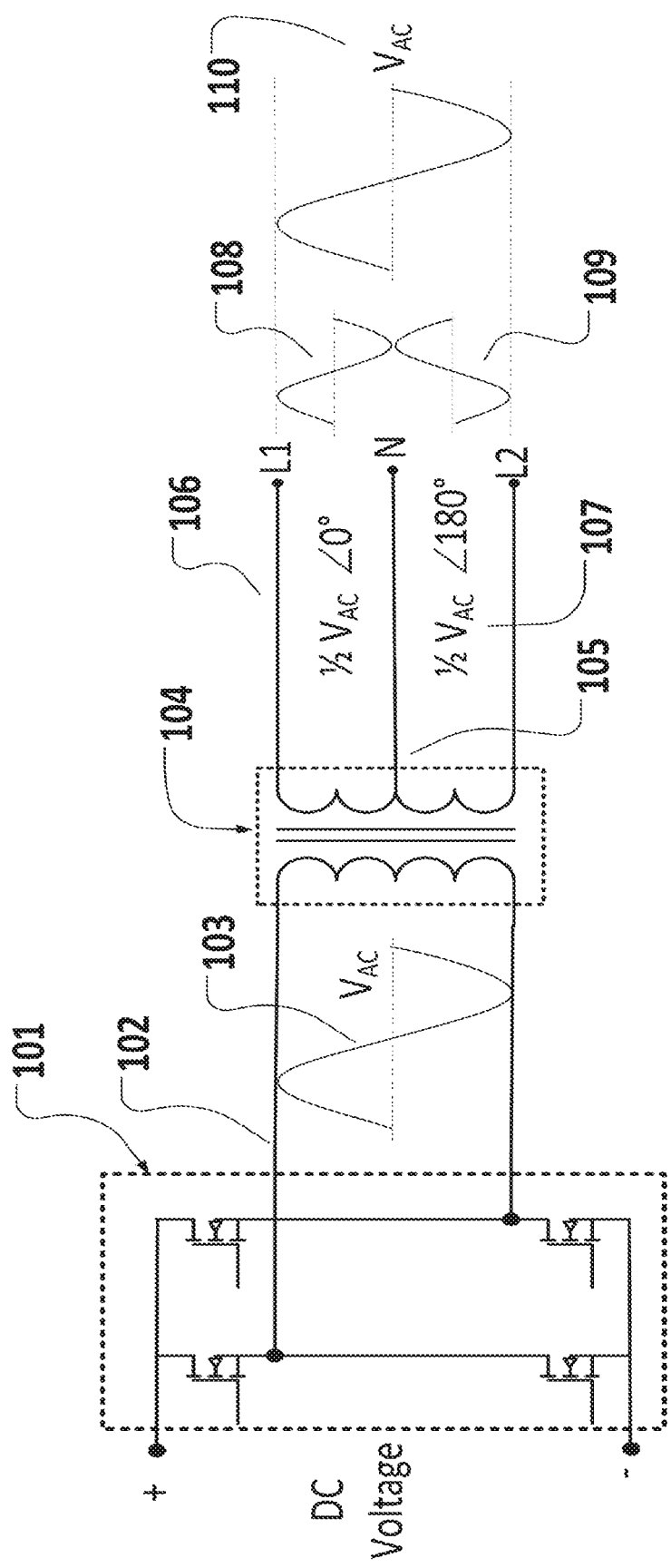
FIG. 1 is a schematic diagram of a prior art, transformer based, full bridge, DC AC inverter system that provides output voltage splitting.

FIG. 1 shows a schematic diagram of a prior art, transformer based, full bridge, DC AC inverter system that provides output voltage splitting. In particular, the prior art apparatus: (a) converts DC voltage input into AC voltage (AC voltage 103); (b) splits AC voltage 103 into two voltages (AC voltages 108 and 109) that each have half the amplitude of AC voltage 103; and (c) maintains an output (AC voltage 110) which has the amplitude of AC voltage 103. As shown in FIG. 1, DC voltage is applied as input to inverter 101 which produces AC voltage 103 with amplitude $V_{AC}$ at a given frequency as an output. Inverter 101 is a full bridge inverter that is known in the art. As is well known, inverter 101 generates AC voltage 103 (shown illustratively as a sine wave in FIG. 1) in response to control signals provided by a controller (not shown for ease of understanding the description) to operate switches 151-154 in a well-known manner such that AC voltage 103 is produced. As shown in FIG. 1, line 102 is applied as input to a primary winding of transformer 104. As further shown in FIG. 1, a center tapped, secondary winding of transformer 104 produces two outputs; L1 on line 106 and L2 on line 107 which share a common neutral point N on line 105. As is well known, if a connection is made between output line 106 and neutral line 105 or between output line 107 and neutral line 105, the resulting outputs will be 180 degrees out of phase with respect to each other, and the amplitude of each output will be one-half of the amplitude output from inverter 101, i.e., AC voltage 103. Further, when a connection is made between output line 106 and output line 107, the amplitude of the resulting output, AC voltage 110, will be proportional to the turns ratio of the primary and secondary coils of transformer 104 relative to AC voltage 103. When a typical inverter is connected to a utility service line, a utility line transformer provides phase splitting and $240V_{AC}/120V_{AC}$ service. However, for an off-grid inverter, if both a $240V_{AC}$ service and a $120V_{AC}$ service are required, then some type of phase splitting or neutral point must be generated by the inverter.

Problems arise with higher power inverters since they require increasingly larger transformers. This results in more costly, heavier and less efficient transformers because of their iron cores and large gauge copper windings. An additional problem arises due to the fact that transformer windings are specific to narrow ranges of frequencies. Because of this, transformers are typically application specific and are not interchangeable with those designed for different frequencies of operation.

Figure 2:
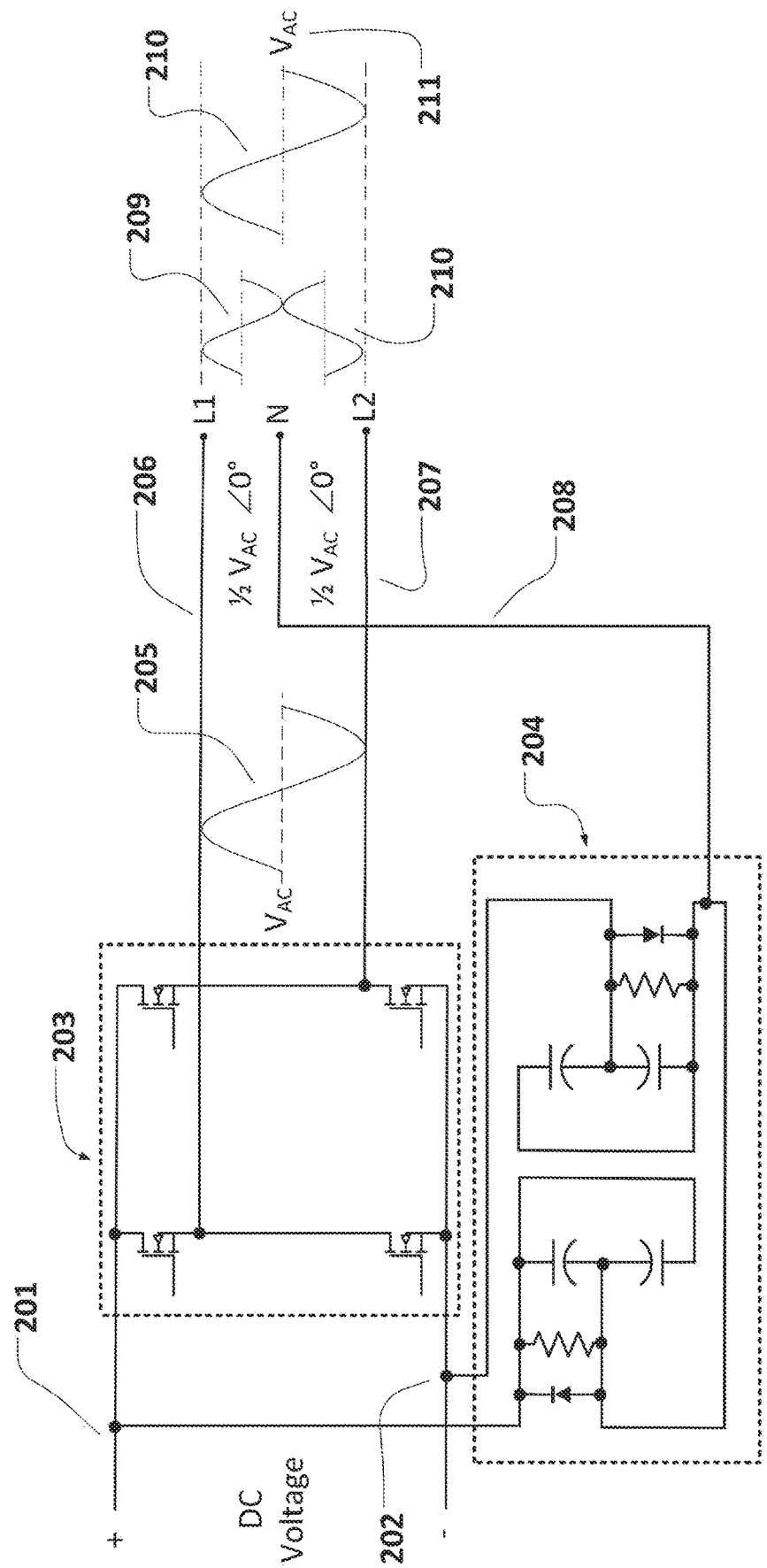
FIG. 2 shows a schematic diagram of an embodiment of a capacitor-based, full bridge, DC AC inverter system that provides output voltage splitting.

FIG. 2 shows a schematic diagram of capacitor-based, full bridge, DC AC inverter system 450 that provides output voltage splitting. As shown in FIG. 2, input DC voltage is applied as input to inverter 203 which produces AC voltage 205 with amplitude $V_{AC}$ at a given frequency as output. Inverter 203 is a full bridge inverter that is well known in the art that may be fabricated using, for example and without limitation, MOSFET switches, for example and without limitation, SiC MOSFET switches, which are well known and commercially available. Note that any of a number of commercially available full bridge inverters is suitable for use in fabricating system 450. As such, inverter 203 is intended to be illustrative of a suitable, full bridge rectifier, and it is not intended to be restricted to any one such example. As is well known, inverter 203 generates AC voltage 205 (shown illustratively as a sine wave in FIG. 2) in response to control signals provided by a controller (not shown for ease of understanding the description) to operate the switches in a well-known manner such that AC voltage 205 is produced on lines 206 and 207. Any of a number of commercially available controllers such as, for example and without limitation, a controller available from Microchip Technology Inc. having corporate headquarters at 2355 West Chandler Blvd., Chandler, Ariz., USA 85224-6199, are suitable for use in fabricating system 450. As further shown in FIG. 2, input DC voltage is applied as input to circuit module 204 and, in response, circuit module 204 provides a center voltage, neutral point N on line 208 between output L1 on line 206 and output L2 on line 207. If a connection is made between output line 206 and neutral line 208 or between output line 207 and neutral line 208, the resulting outputs will be two, equal, half amplitude output AC voltages 209 and 210 that are 180 degrees out of phase with respect to each other, where the amplitude of each output will be one-half of the amplitude output from inverter 203, i.e., AC voltage 205. Further, when a connection is made between output line 206 and output line 207, the amplitude of the resulting output, AC voltage 211 is equal to output AC voltage 205 from inverter 203. Advantageously, since there are no output coils at the 240 Volt output, there is no insertion loss on the 240V line.

Figure 3:
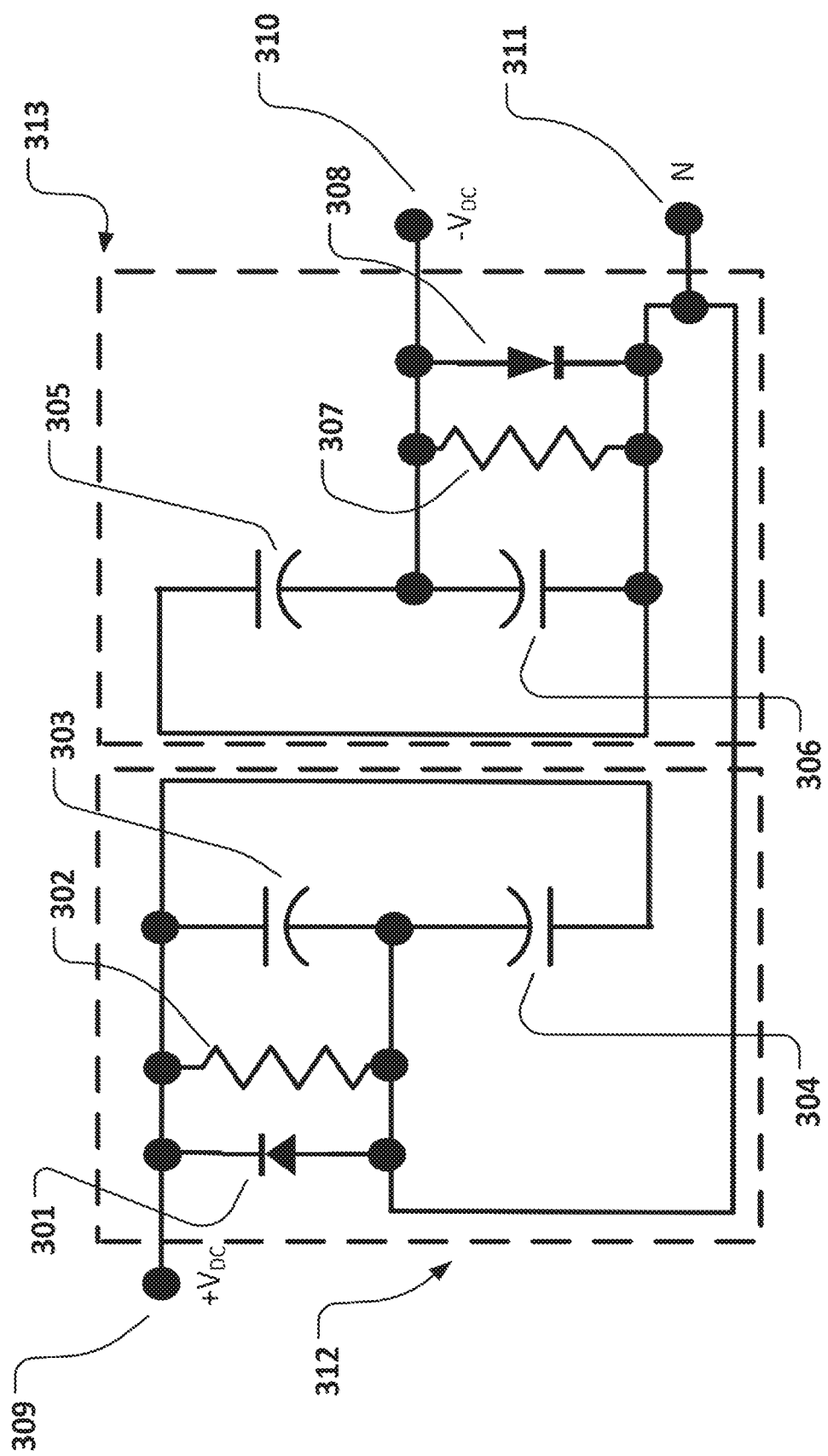
FIG. 3 is a schematic diagram of a module utilized to fabricate the capacitor-based, full bridge, DC AC inverter system shown in FIG. 2.

FIG. 3 shows a circuit diagram of module 204 utilized to fabricate full bridge DC AC inverter system 450 shown in FIG. 2. As shown in FIG. 3, module 204 is comprised of two modules, module 312 and module 313. Input node 309 of module 312 is connected to positive DC voltage ($+V_{DC}$) input to module 203 of DC AC inverter system 450 and input node 310 of module 313 is connected to negative DC voltage ($-V_{DC}$) input to module 203 of DC AC inverter system 450. As further shown in FIG. 3, input node 309 of module 312 is connected to a bank of capacitance comprised of capacitors 303 and 304, and input node 310 of module 313 is connected to a bank of capacitance comprised of capacitors 305 and 306. More specifically, in accordance with one or more embodiments: (a) input node 309 is connected to: (i) a first end of resistance 302; (ii) a first end of capacitor 303; and (iii) a first end of capacitor 304 and (b) input node 310 is connected to: (i) a first end of resistance 307; (ii) a second end of capacitance 305; and (iii) a second end of capacitor 306). Output from the banks of capacitance in modules 312 and 313 are applied to output node 311 to generate a neutral point voltage N at node 311 having an amplitude between input voltage $+V_{DC}$ and input voltage $-V_{DC}$. More specifically, in accordance with one or more embodiments: (a) output node 311 is connected to: (i) a second end of resistance 302; (b) a second end of capacitance 303; and (c) a second end of capacitance 304 and (b) output node 311 is connected to: (i) a second end of resistance 307; (ii) a first end of capacitance 305; and (iii) a first end of capacitance 306. In accordance with one or more such embodiments, when the resistance of resistances 302 and 307 are equal, voltage N output at node 311 is halfway between $+V_{DC}$ applied at node 309 and $-V_{DC}$ applied at node 310 (if the resistance of resistance 302 is not equal to the resistance of resistance 307, the voltage N will not be halfway between $+V_{DC}$ applied at node 309 and $-V_{DC}$ applied at node 310—it is preferred to have the resistances of resistances 302 and 307 be equal). It should be understood that, although resistances 302 and 307 have been shown as single resistors, further embodiments exist where one or more of these resistors comprises a composite of more than a one resistor—as such, it is the resistance of such composites that is of note. It should be understood that, although capacitances 303, 304, 305 and 306 have been shown as single capacitors, further embodiments exist where one or more of these capacitors comprises a composite of more than a single capacitor—as such, it is the capacitance of such composites that is of note. In accordance with one or more embodiments, capacitances 303, 304, 305 and 306 are polarized capacitors. As such, the first end of capacitors 303, 304, 305 and 306 would be labeled as the anode pin (+).

Since inverters generate an AC voltage by alternatingly switching between $+V_{DC}$ and $-V_{DC}$, their AC voltage output will always be centered between, and at a magnitude less than or equal to, $+V_{DC}$ and $-V_{DC}$. Further, because voltage N at output node 311 is midway between $+V_{DC}$ and $-V_{DC}$, voltage N is also midway between the output AC voltage from the inverter.

In accordance with one or more further embodiments, module 312 includes protection diode 301 and protection diode 308. As shown in FIG. 3, (a) a first end of diode 301, the cathode, is connected to input node 309 and to the first end of capacitance 303; (b) a second end of diode 301, the anode, is connected output node terminal 311; (c) a second end of diode 308, the anode, is connected to input node 310; and (d) a first end of diode 308 is connected to output node 311. In accordance with one or more further such embodiments, protection diodes 301 and 308 will conduct current whenever voltage N is inadvertently driven above $+V_{DC}$ or below $-V_{DC}$, respectively. For example, whenever protection diodes 301 or 308 conduct, they will prevent voltage N from becoming greater or lesser than $+V_{DC}$ or $-V_{DC}$, respectively. In this manner, voltage N presents a neutral point, half way between the AC peak amplitude of the output AC voltage from inverter 203 shown in FIG. 2. Further, because module 204 is referenced to DC Voltage and not to AC voltage, no AC current from lines 206 and 207 of DC AC inverter system 450 (refer to FIG. 2) travel through module 204. Since no AC current flows through module 204, module 204 does not affect the amplitude of output AC voltage 205 generated by inverter 203 shown in FIG. 2.

In accordance with one or more embodiments, the selection of capacitors 303, 304, 305 and 306 is determined by the magnitude of $+V_{DC}$ applied at node 309 and $-V_{DC}$ applied at node 310. The voltage rating of the capacitors must be at least equal to, and preferably greater, than the magnitude of the voltage between $+V_{DC}$ and $-V_{DC}$. Another factor affecting capacitor selection is power imbalance between L1 and N and L2 and N. For example, if it is desired to allow twice as much power to flow in leg L1 and N as flows in leg L2 and N, with only a small (for example, 5%) difference in voltage between L1 and N and L2 and N, then a value of capacitance must be correctly chosen. The value of capacitance is determined: (a) by how much allowable power imbalance is specified by a designer between neutral point N and L1 and L2, and (b) by how much resulting AC voltage imbalance results between neutral point voltage N and voltages L1 and L2 is specified by the designer. In particular, greater power imbalance and lesser voltage imbalance requires proportionally larger capacitance values for capacitors 303, 304, 305 and 306.

For example, let PΔ represent the allowed power imbalance in watts of either L1 to N or L2 to N. Further, let Vnom be the nominal desired output voltage of L1 to N and L2 to N for example, 120V AC. Still further, let VΔ represent the allowed fraction of voltage difference relative to Vnom between either L1 and N to L2 and N, when either L1 or L2 have a power imbalance PΔ. Finally, let Zc be the reactive impedance of capacitors 303, 304, 305 and 306. Then, the formula:

$$Zc = \frac{V\Delta * Vnom}{P\Delta} \quad (1)$$

gives the maximum capacitor impedance required to achieve the desired VΔ at the desired PΔ. The formula for the impedance of a capacitor is well known as $Zc=1/2\pi fC$, where Zc is the impedance of the neutral point circuit capacitors 303, 304, 305 and 306, C is the capacitor size in Farads, and f is the operating frequency (for example, 60 for 60 Hz operation).

Figure 4:
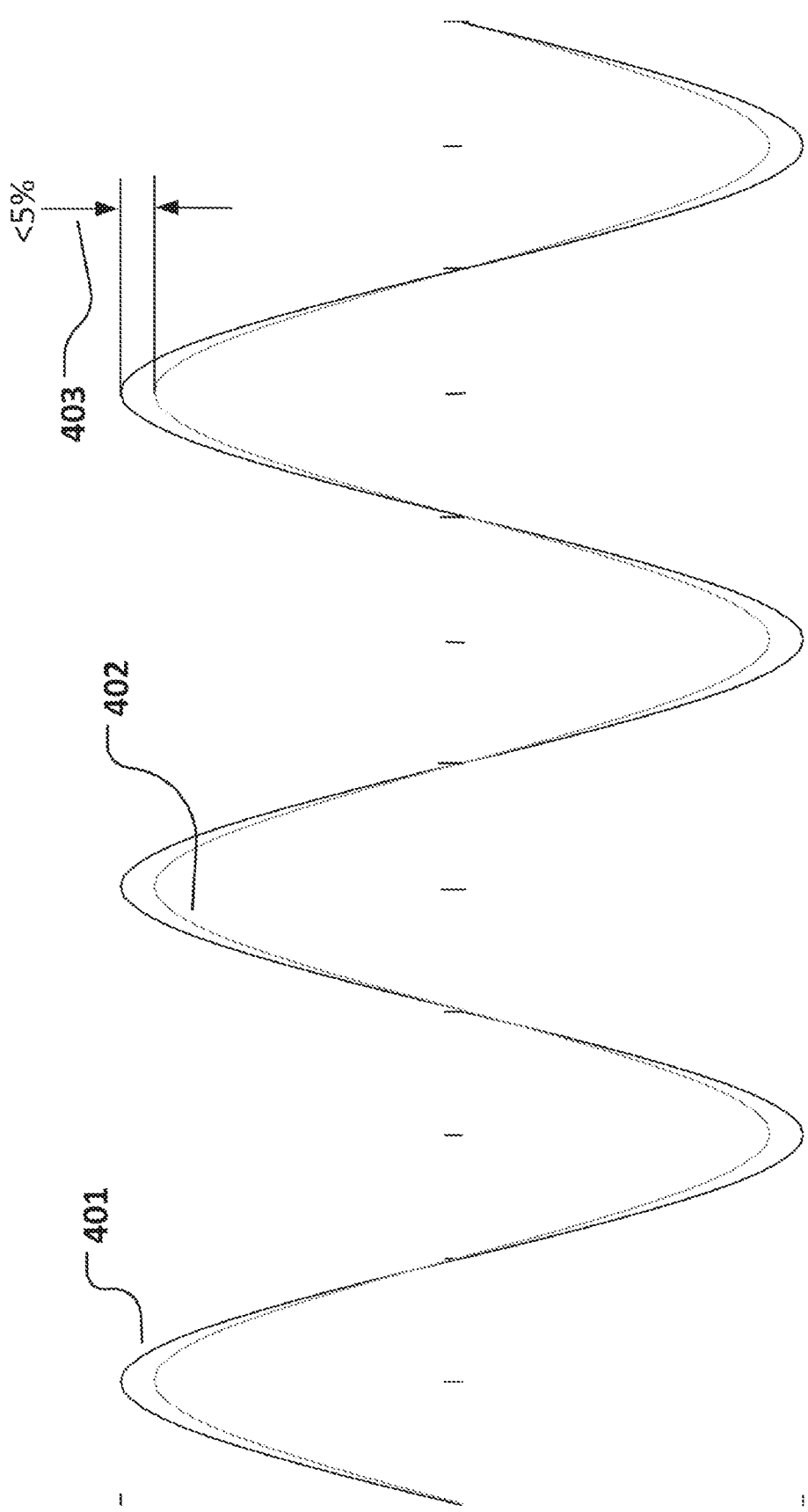
FIG. 4 shows an example of voltage imbalance produced from the embodiment shown in FIG. 2.

FIG. 4 shows an example of the voltage imbalance produced from embodiment 450 shown in FIG. 2. In this example, a power imbalance (PΔ) between either L1 and N or between L2 and N results in a voltage imbalance (VΔ) between either L1 and N or between L2 and N. For embodiment 450 shown in FIG. 2, output waveforms were measured at a first output, i.e., output 401 between L1 and N at no-load, and at a second output, i.e., output 402 between L2 and N at full load. For this example, VΔ is 5% or VΔ=0.05. Advantageously, one or more embodiments can tolerate 100% power imbalance between split voltages L1 and N and L2 and N, thereby reducing the need for precise balancing of loads at an electrical distribution panel.

Embodiment 450 shown in FIG. 2 needs to use different values of capacitance in module for 204 for different output line frequencies, even for the same power imbalance PΔ and voltage imbalance VΔ. To calculate suitable capacitance values for different line frequencies, use the same formula $Zc=1/2\pi fC$ where Zc is calculated using eqn. (1) shown above for each of capacitors 303, 304, 305 and 306.

Single phase AC inverters intended for use with solar panels, in both on-grid and off-grid applications, need substantial input capacitance on the DC input of the inverter in order to reduce AC current ripple inherent in such designs. As each AC output voltage wave is generated (see for example, FIG. 2), AC output current climbs from minimum to maximum, then reverses and drops to a minimum again. Since the AC output current is generated from the DC input current this rising and falling AC output current is also present in the DC input as a rising and falling current. When connected to solar panels, the continually rising and falling current results in a corresponding rising and falling AC voltage on the solar panel. In order to harvest maximum power from a solar panel, the panel must be held at the manufacturer's specified maximum power point voltage (Mppv) at all times. In order to minimize the AC current and voltage swings on the DC voltage, inverters are designed with significant input capacitance. This input capacitance filters out the AC current and voltage ripple as is well known to those versed in the arts of inverter design. In accordance with one or more further embodiments, the capacitor arrangement in module 204 shown in FIG. 3 will serve as both an input ripple reduction filter as well as a neutral point capacitor arrangement. In this manner, the novel arrangement of existing ripple reduction filters serves the secondary feature of a split phase neutral point. This provides a split phase output with minimal additional cost.

It should be understood that embodiments exist where the transformer-less, tapped point AC voltage splitter is integrated into the full bridge, DC AC inverter and that further embodiments exist where the transformer-less, tapped point AC voltage splitter is not integrated into the full bridge, DC AC inverter.

Embodiments of the present invention described above are exemplary, and many changes and modifications may be made to the description set forth above by those of ordinary skill in the art while remaining within the scope of the invention. Thus, the disclosure of the invention is intended to be illustrative, but not limiting, of the scope of the invention. As such, the scope of the invention should be determined with reference to the appended claims along with their full scope of equivalents.

What is claimed is:

1. A DC AC inverter system having a positive DC voltage input line, a negative DC voltage input line, a first output voltage line, a second output voltage line, and an intermediate output voltage line, that, in response to a positive DC voltage applied to the positive DC voltage input line and a negative DC voltage applied to the negative DC voltage input line, provides a first AC voltage between the first output voltage line and the intermediate output voltage line, a second AC voltage between the second output voltage line and the intermediate output voltage line, and a third AC voltage between the first output voltage line and the second output voltage line, the system comprising:

a full bridge DC AC inverter connected to the positive DC voltage input line and the negative DC voltage input line for outputting the third AC voltage;

a first module connected to the positive DC voltage input line and to the intermediate output voltage line; and a second module connected to the negative DC voltage input line and to the intermediate output voltage line;

wherein:

the first module comprises a first bank of capacitance connected to the positive DC voltage input line and to the intermediate output voltage line;

the second module comprises a second bank of capacitance connected to the negative DC voltage input line and to the intermediate output voltage line;

a capacitance of the first bank of capacitance and the second bank of capacitance is greater than $P\Delta/(V\Delta*Vnom*2\pi f)$ where: (a) $P\Delta$ is a predetermined power imbalance in watts between the first output voltage line and the intermediate output voltage line and the second output voltage line and the intermediate output voltage line; (b) Vnom is a predetermined nominal output voltage for the first AC voltage and the second AC voltage; (c) $V\Delta$ is a predetermined fraction of voltage difference, relative to Vnom, between the first AC voltage and the second AC voltage when there is a power imbalance $P\Delta$; and (d) f is a frequency of the first or second AC voltage; and neither the first bank of capacitance nor the second bank of capacitance is connected to an active device for discharge in response to differences in voltage across the first and second bank of capacitance.

2. The DC AC inverter system of claim 1 wherein:

the first module further comprises a first resistance connected to the positive DC voltage input line and to the intermediate voltage output line; and the second module further comprises a second resistance connected to the negative DC voltage input line and to the intermediate voltage output line.

3. The DC AC inverter system of claim 2 wherein the resistance of the first resistance and the second resistance are equal.

4. The DC AC inverter system of claim 1 wherein:

the first module further comprises a first protection diode connected to the positive DC voltage input line and to the intermediate voltage output line; and the second module further comprises a second protection diode connected to the negative DC voltage input line and to the intermediate voltage output line.

5. The DC AC inverter system of claim 1 wherein the first module and the second module are integrated into the DC AC inverter.

6. The DC AC inverter system of claim 3 wherein one or more of the first and second resistances comprise one or more resistors.

7. The DC AC inverter system of claim 1 wherein one or more of the first and second banks of capacitance of the first and second modules comprises one or more capacitors.

8. The DC AC inverter system of claim 1 wherein the inverter comprises MOSFET switches.

9. The DC AC inverter system of claim 1 wherein the MOSFET switches are SiC MOSFET switches.

10. The DC AC inverter system of claim 7 wherein the one or more capacitors are polarized capacitors.

11. The DC AC inverter system of claim 4 wherein the first protection diode has a cathode which is connected to the positive DC voltage input line and an anode which is connected to the intermediate voltage output line; and the second protection diode has a cathode which is connected to the intermediate voltage output line and an anode which is connected to the negative DC voltage input line.

* * * * *